(12) United States Patent
Carrender

(10) Patent No.: US 6,927,687 B2
(45) Date of Patent: Aug. 9, 2005

(54) METHOD AND APPARATUS FOR DETERMINING AVERAGE ENVIRONMENTAL CONDITIONS

(75) Inventor: Curt Carrender, Morgan Hill, CA (US)

(73) Assignee: Battelle Memorial Institute K1-53, Richland, WA (US)

( * ) Notice: Subject to any disclaimer, the term of this patent is extended or adjusted under 35 U.S.C. 154(b) by 0 days.

(21) Appl. No.: 10/192,287

(22) Filed: Jul. 9, 2002

(65) Prior Publication Data

US 2004/0008112 A1 Jan. 15, 2004

(51) Int. Cl.[7] ................................................ G08B 1/08
(52) U.S. Cl. ............... 340/539.26; 340/505; 340/539.1; 340/539.22; 340/539.27; 340/10.1
(58) Field of Search .................. 340/539.26, 572.1, 340/505, 502, 501, 622, 10.1, 10.4, 540, 539.1, 539.22, 539.27, 825.54

(56) References Cited

U.S. PATENT DOCUMENTS

| | | | | | |
|---|---|---|---|---|---|
| 5,774,062 | A | * | 6/1998 | Ikefuji | 340/825.54 |
| 5,907,278 | A | * | 5/1999 | Park et al. | 340/450.3 |
| 6,294,997 | B1 | * | 9/2001 | Paratore et al. | 340/572.1 |
| 6,501,390 | B1 | * | 12/2002 | Chainer et al. | 340/870.16 |
| 6,563,417 | B1 | * | 5/2003 | Shaw | 340/10.1 |

* cited by examiner

*Primary Examiner*—Davetta W. Goins
(74) *Attorney, Agent, or Firm*—Seed IP Law Group PLLC

(57) ABSTRACT

A system for monitoring an environmental condition and determining the average environmental condition using an RFID tag and reader, the tag configured to have at least one module with known characteristics that are dependent on the environmental condition and to be responsive to interrogation by the reader to asses the state of the known characteristics for determining the average environmental condition.

23 Claims, 2 Drawing Sheets

METHOD AND APPARATUS FOR DETERMINING AVERAGE ENVIRONMENTAL CONDITIONS

BACKGROUND OF THE INVENTION

1. Field of the Invention

The present invention pertains to a device and method for monitoring environmental conditions and, more particularly, to a radio frequency identification tag and system configured to measure average environmental conditions.

2. Description of the Related Art

It is often necessary to monitor environmental conditions, especially controlled environments, to ensure they remain within defined parameters. For example, frozen foods shipped from a manufacturing plant to a distribution center or retail store must be maintained at or below a freezing temperature. This requires use of a sensor to constantly monitor the shipping environment and to activate a refrigeration unit as needed.

Oftentimes environmental conditions will change for undetected periods of time. In the example above, this can occur when a sensor or refrigeration unit operates intermittently and is not detected or is ignored by the human operator. Regardless of the cause, prolonged periods of inoperation of the refrigeration unit will cause the temperature of the food to rise to a level that can cause spoilage. The food spoilage can go undetected when the refrigeration unit resumes operation and the food returns to a frozen state.

Consequently, there is a need for reliable monitoring of environmental conditions in an unobtrusive and inexpensive manner.

The disclosed embodiments of the invention are directed to a unique implementation of a radio-frequency (RF) communication system, such as that employed in radio-frequency identification (RFID) technology. As shown in FIG. 1, a basic RFID system 10 includes two components: an interrogator or reader 12, and a transponder (commonly called an RF tag) 14. The interrogator 12 and RF tag 14 include respective antennas 16, 18. In operation, the interrogator 12 transmits through its antenna 16 a radio frequency interrogation signal 20 to the antenna 18 of the RF tag 14. In response to receiving the interrogation signal 20, the RF tag 14 produces an backscatter modulated response signal 22 that is reflected back to the interrogator 12 through the tag antenna 18. This process is known as modulated backscatter.

The conventional RF tag 14 includes an amplitude modulator 24 with a switch 26, such as a MOS transistor, connected between the tag antenna 18 and ground. When the RF tag 14 is activated by the interrogation signal 20, a driver (not shown) creates a modulating signal 28 based on an information code, typically an identification code, stored in a non-volatile memory (not shown) of the RF tag 14. The modulating signal 28 is applied to a control terminal of the switch 26, which causes the switch 26 to alternately open and close. When the switch 26 is open, the tag antenna 18 reflects a portion of the interrogation signal 20 back to the interrogator 12 with one amplitude and phase as a portion 28 of the response signal 22. When the switch 26 is closed, the tag antenna reflects a second amplitude phase. In other words, the interrogation signal 20 is amplitude-modulated to produce the response signal 22 by alternately reflecting and absorbing at a different amplitude and phase the interrogation signal 20 according to the modulating signal 28, which is characteristic of the stored information code. Upon receiving the response signal 22, the interrogator 12 demodulates the response signal 22 to decode the information code represented by the response signal.

The substantial advantage of RFID systems is the non-contact, non-line-of-sight capability of the technology. The interrogator 12 emits the interrogation signal 20 with a range from one inch to one hundred feet or more, depending upon its power output and the radio frequency used. Tags can be read through a variety of parameters, such as odors, or substances such as fog, ice, paint, dirt, and other visually and environmentally challenging conditions where bar codes or other optically-read technologies would be useless. RF tags can also be read at remarkable speeds, in most cases responding in less than one hundred milliseconds.

A typical RF tag system 10 will contain a number of RF tags 14 and the interrogator 12. The three main categories of RF tags are beam-powered passive tags, battery-powered semi-passive tags, and active tags. Each operates in fundamentally different ways.

The beam-powered RF tag is often referred to as a passive device because it derives the energy needed for its operation from the interrogation signal beamed at it. The tag rectifies the field and changes the reflective characteristics of the tag itself, creating a change in reflectivity that is seen at the interrogator. A battery-powered semi-passive RFID tag operates in a similar fashion, modulating its RF cross-section in order to reflect a delta to the interrogator to develop a communication link. Here, the battery is the source of the tag's operational power. Finally, in the active RF tag, a transmitter is used to create its own radio frequency energy powered by the battery.

The range of communication for such tags varies according to the transmission power of the interrogator 12 and the RF tag 14. Battery-powered tags operating at 2,450 MHz have traditionally been limited to less than ten meters in range. However, devices with sufficient power can reach up to 200 meters in range, depending on the frequency and environmental characteristics.

Conventional continuous wave backscatter RF tag systems utilizing passive (no battery) RF tags require adequate power from the interrogation signal 20 to power the internal circuitry in the RF tag 14 used to amplitude-modulate the response signal 22 back to the interrogator 12. While this is successful for tags that are located in close proximity to an interrogator 12, for example less than three meters, this may be insufficient range for some applications, for example, which require greater than 100 meters.

BRIEF SUMMARY OF THE INVENTION

The disclosed and claimed embodiments of the invention are directed to a method and apparatus that utilizes a radio frequency identification (RFID) tag with a unique configuration to detect average environmental conditions.

In accordance with one embodiment of the invention, a device for measuring environmental conditions, such as temperature, is provided. The device includes a first module having known characteristics that are dependent on at least one environmental condition and configured to be responsive to a radio frequency interrogation signal for determining the state of the known characteristics and assessing the average of the at least one environmental condition.

In accordance with another embodiment of the invention, a device for measuring environmental conditions is provided that includes a first module having known characteristics dependent on at least one environmental condition; a second module having known characteristics that are dependent on the at least one environmental condition; the first and second devices configured to be responsive to a radio frequency interrogation of the state of their respective known characteristics for assessing the at least one environmental condition. In another embodiment, the first module has known characteristics that are dependent on temperature, and the second module is configured to track elapsed time.

In accordance with yet another embodiment of the invention, a system for determining average environmental conditions is provided. The system includes a measuring device for measuring environmental conditions that includes a first module having known characteristics dependent on at least one environmental condition and configured to be responsive to radio frequency interrogation of the state of the known characteristics; and a device for interrogating the measuring device for the purpose of determining average environmental conditions.

In accordance with a method of the present invention, the measuring of average environmental conditions includes providing an RF device having known characteristics dependent on at least one environmental condition and subjecting the RF device to the at least one environmental condition for a period of time; and obtaining from the RF device the state of the known characteristics. The state of the known characteristics is then used to determine the average environmental condition in which the RF device was subjected.

In accordance with another embodiment of the invention, a method of monitoring temperature during an unpowered state of an RF device is provided. The method includes providing an RF device having known characteristics that are dependent on temperature; exposing the RF device; interrogating the RF device to determine the state of the known characteristics; and calculating average temperature of the RF device from the state of the known characteristics. Ideally the method includes determining elapsed time of exposure of the RF device. This can be accomplished by including in the RF device a sensor that tracks exposure time or by including a device that is sensitive to temperature in combination with a second device that tracks elapsed time.

In accordance with another aspect of the foregoing embodiment, the known characteristics can include the rate of dissipation of a stored charge, such as a charge in the leaking junction of an integrated circuit, a super capacitor, an EEPROM memory, a persistent node, and an electrochemical device, such as a battery. Alternatively, the known characteristics can include variations in oscillator frequency, resistance, or magnetic flux.

In accordance with yet another embodiment of the invention, a device for monitoring temperature is provided that includes a monitoring device configured to change electrical charge state over time and at a rate that varies in response to variations in its temperature; and an RFID circuit coupled to the monitoring device and configured to transmit the state of the electrical charge in response to an interrogation signal.

BRIEF DESCRIPTION OF THE SEVERAL VIEWS OF THE DRAWING(S)

The foregoing features of the present invention will be more readily appreciated as the same become better understood from the following detailed description when taken in conjunction with the accompanying drawings, wherein:

FIGS. 4A and 4B are illustrations of the state of a memory device at initial and elapsed times, respectively.

DETAILED DESCRIPTION OF THE INVENTION

The disclosed embodiments of the invention utilize radio frequency identification (RFID) technology to remotely monitor at least one environmental condition and to determine the average thereof over either a known or a predetermined period of time. Because RFID technology is well known and has been generally described above, it will not be described in further detail herein below.

In one embodiment of the present invention, an RFID tag, preferably a passive tag, is modified to monitor at least one environmental condition. While a passive tag is illustrated and described, the present invention can be implemented using powered tags. For purposes of illustration, the embodiments of the invention will be described herein in the context of monitoring temperature and determining average temperature. However, it is to be understood that the present invention has application to the monitoring of and determining the average of other environmental conditions, including, but not limited to, humidity, air pressure, and light.

Ideally, the RFID tag is configured to determine elapsed time and the change in temperate over the elapsed time to enable calculation of average temperature. One approach is to use comparative voltages to measure elapsed time and change in temperature, preferably without using a source of power.

Figure 1:
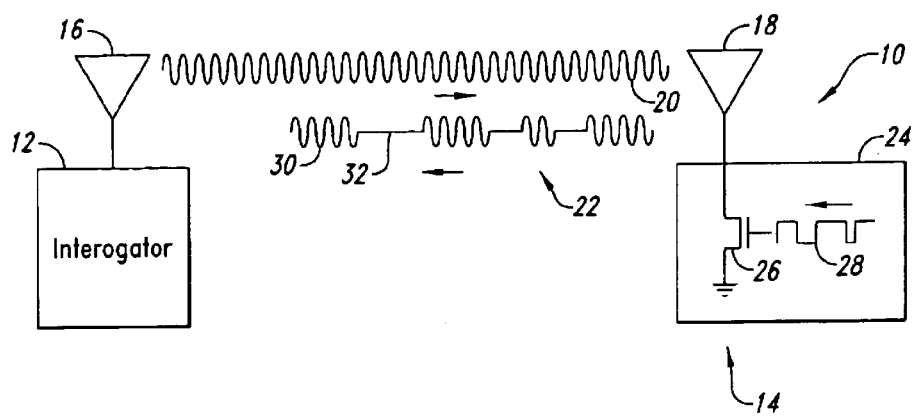
FIG. 1 is a known RFID system.
Figure 2A:
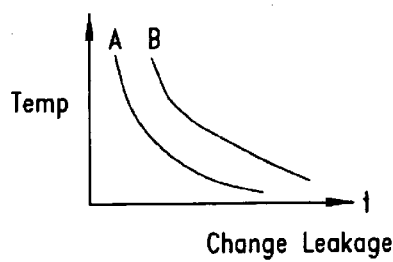
FIGS. 2A and 2B are graphs illustrating time and temperature dependency characteristics, respectively.
Figure 2B:
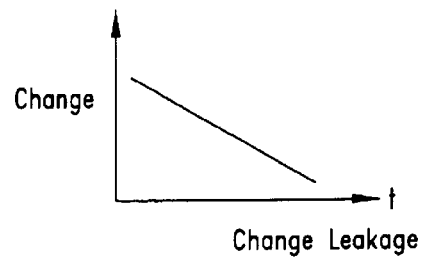

For example, two or more capacitors can be charged to their full voltage capacity, and the amount of charge residing in the capacitors is measured. Each capacitor will have a unique charge leakage characteristic that varies with temperature, as shown in FIG. 2A. In some cases, the rate of charge leakage will increase rapidly as temperature rises, and in other cases it will increase slowly or react with a negative slope to temperature increase. In addition, a capacitor may be configured to track time independent of temperature. Such a capacitor would have the characteristics shown in FIG. 2B.

After an amount of time, which can be a predetermined time or an elapsed time, the charge level on each capacitor is checked. The amount of charge that remains will be a function of the rate of leakage of the capacitor and the time elapsed since the initial charge occurred. Because the rate of leakage is a function of temperature, the amount of charge remaining is a function of average temperate multiplied by amount of elapsed time. Because there are two or more capacitors, and thus the partial solution to two or more equations can be used, it is possible to determine with precision the amount of elapsed time and the change in temperature over this time.

Figure 3:
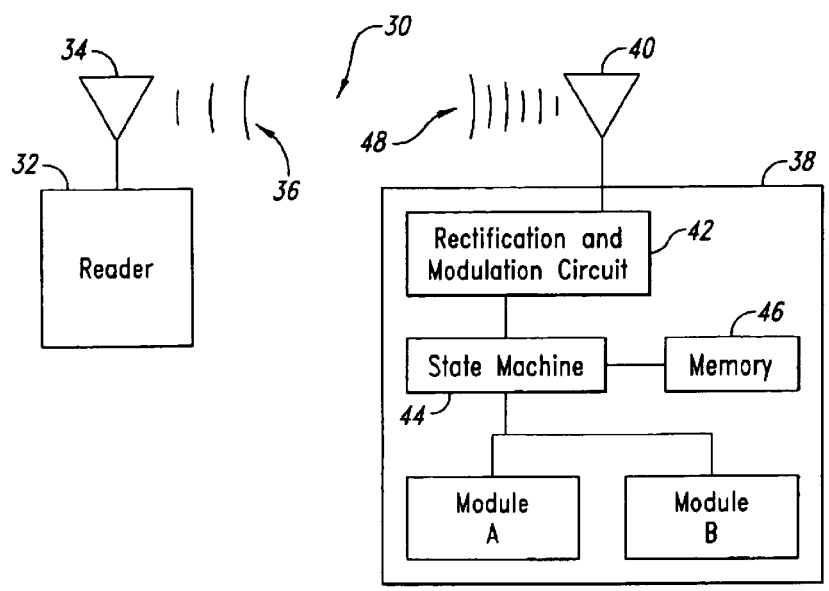
FIG. 3 is a diagram illustrating a system that includes the components of an RFID tag formed in accordance with one embodiment of the invention.

FIG. 3 illustrates one embodiment of the invention wherein a diagram of an RFID system 30 is shown. The system includes a reader 32 transmitting an interrogation signal 34 via an antenna 36, and a tag 38 having an antenna 40 coupled to a rectification and modulation circuit 42 that receives input from a state machine 44, which in turn is coupled to a memory 46. Two temperature-dependent modules A and B each have an output coupled to the state machine 48. The rectification and modulation circuitry 42, state machine 44, and memory 46 are each constructed in accordance with known designs and techniques, and inasmuch as they are readily commercial available, they will not be described in detail herein.

Briefly, these components along with modules A and B, which are described in more detail below, are preferably formed as an integrated circuit. Such circuit may take the form illustrated in U.S. Pat. Nos. 6,291,896, 6,281,038, and 6,274,508, which are incorporated herein in their entirety. Each tag 38 may be formed from circuits constructed in accordance with the manufacturing and "fluidic self-assembly" techniques described in these patents.

Each temperature-dependent module A, B will have its own characteristics that are responsive in a different manner to temperature variations. The following operational example is given to illustrate the method of calculating elapsed time, change in temperature, and average temperature.

Assume in FIG. 3 that the two temperature-dependent modules A, B, have the following characteristics:

A: $U_a = -3T - 2t$

B: $U_b = -2T + 3t$ where T is the time in days and t is the temperature in degrees Centigrade.

Upon interrogation, the tag will read back the following values for each temperature dependent module A and B:

$$U_a = -46 \quad U_b = 56$$

Applying this to the equations above:

For $U_a$: $-46 = -3(T) - 2(t)$

For $Ub$: $56 = -2(T) + 3(t)$

In order to solve for T, it will be necessary to multiply both equations by appropriate values so that upon addition only the variable T remains:

For $U_a \times 3$: $-138 = 9(T) - 6(t)$

For $Ub \times 2$: $112 = -4(T) + 6(t)$

Adding these two equations together results in:

$$-26 = -13(t)$$

Thus, solving for T, the average temperature is 20 degrees Centigrade and the elapsed time is two days.

While the system of the present invention may have different configurations, it includes essentially a tag configured to be sensitive to changes in an environmental condition, such as temperature, and a reader for interrogating the tag to determine the state of the characteristics of the tag for calculation of the average temperature. The determination of average temperature may be made by the reader or by a processor coupled to the reader or configured to receive the information from the reader in a known manner.

In the exemplary embodiment, the system is placed in use by associating the tag 38 with a refrigerated container, such as used in trucking or on an article of food. Reading of the tag 38 is accomplished in accordance with known RFID techniques. For example, the tag 38 can be interrogated as it passes within range of the reader 32, such as at a point of departure, a checkpoint, and as it arrives at the destination.

The reader 32 is configured to transmit an interrogation signal 36 to the tag 38, which reflects back a modulated signal 48 carrying the data of the state of the known characteristics, such as stored charge. This data is captured by the reader 32 and processed according to known techniques to determine the average environmental condition, in this case average temperature over the elapsed time.

In an alternative embodiment, module A can be configured to be sensitive to changes in temperature while module B is configured to track elapsed time of exposure, or vice versa. The reader is configured to process the data accordingly. In another alternative embodiment, only module A configured for sensing temperature would be provided in the tag, and the tag would be time stamped by a reader for later calculation of elapsed time.

In yet another instance of the present invention, a memory in the form of a thin-oxide EEPROM 50 having 28 cells 52, as shown in FIG. 4A, may be employed to monitor changes in temperature. In this embodiment, the EEPROM is configured to have known charge leakage characteristics that will change with variations in the ambient temperature. Each cell 52 is precharged, in this case to a state corresponding to a binary value of 1, shown in FIG. 4A. Over time the charge leaks from the cells 52. After an elapsed time, the cells 52 are read in accordance with known techniques. Cells 54 having charge values below a threshold will show as a binary 0, as shown in FIG. 4B. The EEPROM 50 can be formed so that the rate of leakage, as a function of temperature, varies across the EEPROM cells.

While several embodiments of the invention have been illustrated and described herein, it is to be understood that various changes may be made therein without departing from the spirit and scope of the invention. For example, reading of a tag may take place automatically as the tag passes within proximity of a reader, or the tag may be read by manually interrogating the tag with a hand-held reader. Thus, the invention is not be limited except by the scope of the claims that follow and the equivalents thereof.

What is claimed is:

1. A device for measuring environmental conditions, comprising:

a first module having known characteristics dependent on at least one environmental condition;

a second module having known characteristics dependent on the at least one environmental condition and that are different than the known characteristics of the first module;

the first and second modules configured to be responsive to radio frequency interrogation of a state of their respective known characteristics for assessing an average of the at least one environmental condition.

2. The device of claim 1 wherein the at least one environmental condition comprises temperature.

3. A method for detecting an environmental condition during an unpowered state of an RFID tag, the method comprising:

providing an RFID tag having a first device with known characteristics dependent on the environmental condition and a second device with known characteristics dependent on the environmental condition and that are different than the known characteristics of the first device;

interrogating the RFID tag to assess a state of the known characteristics of the first and second devices; and determining an average of the environmental condition in response to the state of the known characteristics of the first and second devices.

4. The method of claim 3 wherein the environmental condition comprises temperature.

5. A system for determining an average of at least one environmental condition, comprising:
   a device for measuring the at least one environmental condition, the device comprising a first module having known characteristics dependent on the at least one environmental condition and a second module having known characteristics dependent on the at least one environmental condition and that are different than the characteristics of the first module, the device configured to respond to a radio frequency interrogation of a state of the known characteristics of the first and second modules; and
   a device for interrogating the measuring device to assess the state of the known characteristics for determining an average of the at least one environmental condition in response thereto.

6. The system of claim 5 wherein the at least one environmental condition comprises temperature.

7. A method of monitoring temperature during an unpowered state of a radio frequency device, the method comprising:
   providing a radio frequency device comprising a first assembly having known characteristics that are dependent on temperature and a second assembly having known characteristics that are dependent on temperature and that are different than the known characteristics of the first assembly;
   exposing the radio frequency device to the temperature;
   interrogating the radio frequency device to determine a state of the first and second assemblies; and
   calculating average temperature of the radio frequency device utilizing the state and the known characteristics of the first and second assemblies.

8. The method of claim 7, further comprising determining elapsed time of exposure of the radio frequency device.

9. The method of claim 7 wherein the known characteristics comprise the rate of dissipation of a stored charge and the state comprises the amount of the stored charge.

10. The method of claim 9 wherein the charge is stored in a leaking junction of an integrated device.

11. The device of claim 9 wherein the charge is stored in a super capacitor that discharges at a rate dependent on temperature.

12. The method of claim 9 wherein the charge is stored in a thin-oxide EEPROM having a rate of charge leakage dependent on temperature.

13. The method of claim 9 wherein the charge is stored on a persistent node having a charge leakage dependent on temperature.

14. The method of claim 9 wherein the charge is stored in an electro-chemical device that discharges at a rate dependent on temperature.

15. The method of claim 7 wherein the known characteristics comprise an oscillator having an oscillation frequency that varies in response to changes in temperature.

16. The method of claim 7 wherein the known characteristics comprise a variable resistance that changes in response to changes in the temperature.

17. The method of claim 7 wherein the known characteristics comprise magnetic flux that varies in response to changes in temperature.

18. The method of claim 7 wherein the RF device is time-stamped by a reader to determine exposure time of the RF device.

19. A method of monitoring average temperature during an unpowered state of a radio frequency (RF) device, the method comprising:
   providing a RF device having at least two sensors with known characteristics that respond to changes in temperature at different rates of change;
   exposing the RF device to the temperature;
   powering the RF device and calibrating the RF device for improving accuracy;
   interrogating the RF device to determine the states of the sensors; and
   calculating average temperature using the determined states of the sensors.

20. A method of monitoring an average environmental condition during an unpowered state of an RF device, comprising:
   providing an RF device comprising a first sensor having a first sensitivity to the environmental condition, and a second sensor having a second sensitivity to the environmental condition that is different than the first sensitivity of the first sensor;
   exposing the RF device to the environmental condition;
   interrogating the RF device to determine a state of each of the first and second sensors; and
   calculating elapsed time and change in state of the first and second sensors to determine an average environmental condition.

21. The method of claim 20 wherein the known characteristics comprise rate of dissipation of a stored charge.

22. A device for monitoring temperature, comprising:
   a first monitoring device configured to change electrical charge state over time and at a first rate in response to variations in its temperature;
   a second monitoring device configured to change electrical charge state over time at a second rate in response to variations in its temperature; and
   an RFID circuit coupled to the first and second monitoring devices and configured to transmit the state of the electrical charge in the first and second monitoring devices in response to an interrogation signal.

23. The device of claim 22 wherein the rate of change of electrical charge state of at least one of the first and second monitoring devices is non-linear.

* * * * *